United States Patent
Nagayama

[11] Patent Number: 6,126,289
[45] Date of Patent: *Oct. 3, 2000

[54] WIDE ANGLE MIRROR ATTACHABLE TO AN EXISTING REAR VIEW MIRROR

[76] Inventor: Koukichi Nagayama, 2-9-6-102 Minatoshinden, Ichikawa-shi, Chiba-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/856,644

[22] Filed: May 15, 1997

[30] Foreign Application Priority Data

May 20, 1996 [JP] Japan ................................ 8-160384
Dec. 11, 1996 [JP] Japan ................................ 8-359307

[51] Int. Cl.[7] ........................... G02B 5/08; G02B 7/182
[52] U.S. Cl. ........................ 359/854; 359/865; 359/866
[58] Field of Search ............................. 339/854, 855, 339/864, 865, 866

[56] References Cited

U.S. PATENT DOCUMENTS

| 1,969,415 | 8/1934 | Ostroff | 359/854 |
|---|---|---|---|
| 3,063,344 | 11/1962 | Slate | 359/871 |
| 3,790,117 | 2/1974 | Winkler | 248/481 |
| 4,019,812 | 4/1977 | Carnine | 359/854 |
| 4,643,544 | 2/1987 | Loughran | 359/854 |
| 4,793,701 | 12/1988 | Brown | 359/865 |
| 4,832,476 | 5/1989 | Gabrielyan | 359/865 |
| 5,165,081 | 11/1992 | Drumheller | 359/854 |

*Primary Examiner*—Cassandra Spyrou
*Assistant Examiner*—Mark A. Robinson
*Attorney, Agent, or Firm*—McDonnell Boehnen Hulbert & Berghoff

[57] ABSTRACT

A wide room mirror in the present invention has a main mirror formed in the shape of a plate body and detachably attached to the surface side of an existing room mirror such that the surface of the existing room mirror is covered with the main mirror. The wide room mirror also has an auxiliary mirror movably connected to the main mirror through a connecting member and supported by the main mirror. Accordingly, a driver can simply use the wide room mirror by attaching the wide room mirror to the conventional existing room mirror. Therefore, a region having an angle and a range wider than those of a region reflected on only the existing room mirror can be seen by the auxiliary mirror.

18 Claims, 14 Drawing Sheets

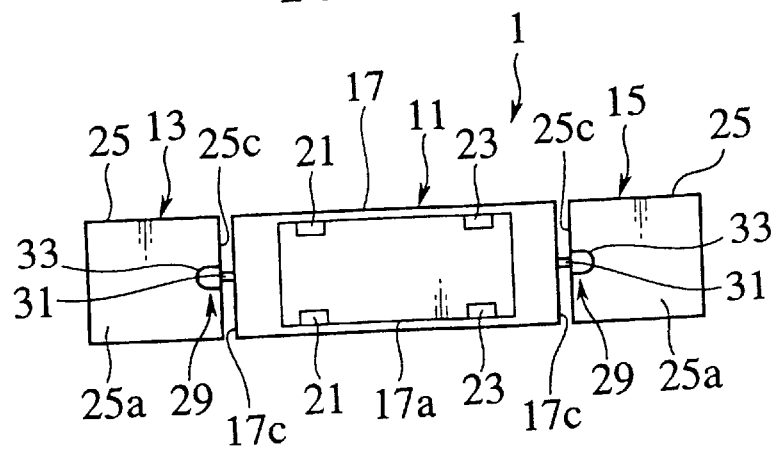
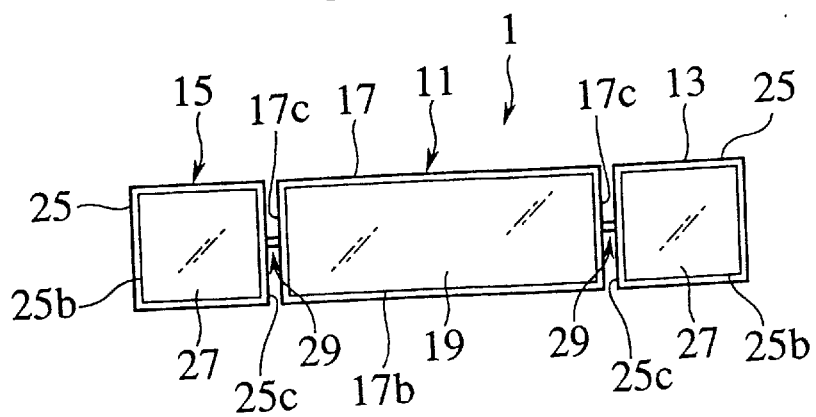
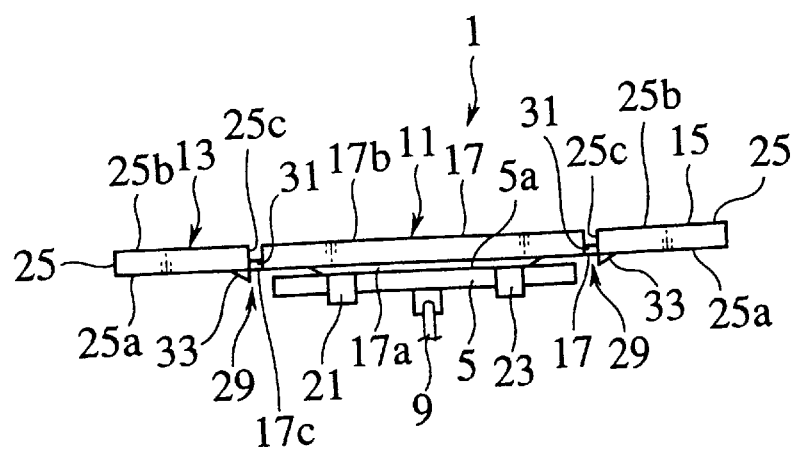

WIDE ANGLE MIRROR ATTACHABLE TO AN EXISTING REAR VIEW MIRROR

REFERENCE TO RELATED APPLICATIONS

This application claims priority enefits under 35 U.S.C. § 119 based on Japanese Patent Application Nos. P8-160384 filed on May 20, 1996 and P8-359307 filed on Dec. 11, 1996.

BACKGROUND OF THE INVENTION

This invention relates to a wide room mirror used by attaching to an existing room mirror arranged in all vehicles including an automobile.

A technique for arranging a room mirror (back mirror) for looking an opposite side in a looking direction without turning a driver's head within each of rooms or compartments of all vehicles including an automobile is conventionally well-known.

A technique for attaching a detachable type mirror having a plane mirror or a curved mirror onto the surface of an existing room mirror is also well-known.

However, as shown in FIG. 29, a region θ 4 reflected on a conventional existing room mirror 301 is limited to a narrow range just behind a vehicle 303.

When the detachable type mirror having a plain mirror is attached onto the existing room mirror, the reflecting region can be enlarged by increasing a size of the plain mirror. However, the size of the plain mirror is limited since a front viewing field is narrowed when the detachable type mirror is increased in size. Accordingly, it was difficult to greatly increase a region θ 5 reflected on the plain mirror with respect to the above region θ 4.

Further, when a convex curved mirror instead of the plain mirror is used as the detachable type mirror, it is possible to enlarge the reflecting region by reducing a radius of curvature of the convex curved mirror. However, the size of a reflected object is reduced by the reduction in the radius of curvature so that it is difficult for a driver to grasp a distance feeling. Accordingly, no radius of curvature of the convex curved mirror can be reduced so much to easily grasp the distance feeling. Therefore, no region reflected on the curved mirror is changed so much in comparison with the region θ 5 formed when the plain mirror is used.

Thus, when the reflecting region formed by the room mirror or the detachable type mirror is narrow, a slanting backward dead angle region 307 unable to be seen without turning the driver's head is increased in size. Therefore, there is a case in which a vehicle 203 is completely located within the dead angle region 307. In this case, the driver must directly see the slanting backward vehicle 203 by turning the driver's head slantingly backward to confirm existence or nonexistence of the slanting backward vehicle 203. Accordingly, there is a fear of a reduction in safety at a driving time of the vehicle. A side mirror arranged outside the vehicle room is known to compensate the viewing field of the room mirror. However, it is generally impossible to sufficiently compensate the above dead angle region 307 by the side mirror.

SUMMARY OF THE INVENTION

An object of the present invention is to provide a wide room mirror able to be used by simply attaching the wide room mirror to a conventional existing room mirror and able to form a wide reflecting region at a wide angle.

To achieve the above object, the present invention resides in a wide room mirror having the following structure.

The wide room mirror is attached to an existing room mirror arranged within a vehicle room. The wide room mirror comprises a main mirror and an auxiliary mirror. The main mirror is formed in the shape of a plate body and detachably attached to a surface side of the existing room mirror such that the surface of the existing room mirror is covered with the main mirror. The auxiliary mirror is movably connected to the main mirror through a connecting member and supported by the main mirror.

The connecting member can have an extending portion extending from a circumferential edge portion of the main mirror along a plate face direction of the main mirror and can also have a connecting portion for movably connecting the extending portion onto a rear face side of the auxiliary mirror. A surface of the auxiliary mirror can be moved from an initial state for approximately setting the surface of the auxiliary mirror onto the same face as a surface of the main mirror to a state in which the surface of the auxiliary mirror is inclined with respect to the surface of the main mirror.

In such structures, when a driver takes a driver's seat, the driver entirely moves the main mirror and the room mirror and sets these mirrors to desirable inclination angles. Thereafter, the auxiliary mirror is inclined by a desirable angle with respect to the main mirror. In this case, the main mirror and the auxiliary mirror are set such that a region just behind a vehicle is reflected on the central main mirror and right-hand slanting backward and left-hand slanting backward regions of the vehicle, etc. are reflected on the auxiliary mirror. Thus, the driver can see a region having an angle and a range wider than those of a region reflected on only the existing room mirror by using the auxiliary mirror. Therefore, a dead angle region unable to be seen without turning the driver's head can be greatly reduced. Accordingly, the driver can recognize a slanting backward vehicle in a state in which the driver's head is directed forward without turning the driver's head backward. Thus, safety at a driving time of the vehicle can be greatly improved.

The wide room mirror is constructed by the main mirror and the auxiliary mirror as a unit. Accordingly, it is sufficient to attach the entire wide room mirror to the existing room mirror so that an attaching work of the wide room mirror is easily made.

The connecting portion can connect an end tip portion of the extending portion to an outside end portion of the auxiliary mirror farthest from the main mirror in an extending direction of the extending portion. The surface of the auxiliary mirror can be moved from the initial state to an external opening state in which an inside end portion of the auxiliary mirror proximate to the main mirror is projected on a surface upward side of the main mirror.

In such a structure, the connecting portion connects the outside end portion of the auxiliary mirror to the end tip portion of the extending portion. Accordingly, when the connecting portion is in proximity to the surface of the room mirror in a state in which the wide room mirror is attached to the existing room mirror, no outside end portion of the auxiliary mirror comes in contact with the surface of the room mirror and the auxiliary mirror can be freely set to the external opening state when the auxiliary mirror is moved from the initial state to the external opening state. Namely, the same wide room mirror can be used with respect to room mirrors having different lengths even when the wide room mirror is entirely thinly formed. Accordingly, the wide room mirror can be set to have a high wide using property.

It is not necessary to arrange the surface of the main mirror in a position greatly separated from the existing room mirror. Accordingly, the driver and the other persons riding in the vehicle have no feeling of physical disorder and a forward appearance of the vehicle room can be improved.

Further, the wide room mirror can be made light in weight and a stabler attaching state of the wide room mirror can be obtained.

The extending portion can have a movable portion for allowing an end tip side of the extending portion to be folded on the surface upward side of the main mirror. The connecting portion can connect the auxiliary mirror to an end tip portion of the extending portion. The surface of the auxiliary mirror can be moved from the initial state to an external opening state in which an inside end portion of the auxiliary mirror proximate to the main mirror is projected on a surface upward side of the main mirror.

In such a structure, the extending portion has the movable portion. Accordingly, when the connecting portion is in proximity to the surface of the room mirror in a state in which the wide room mirror is attached to the existing room mirror, the end tip side of the extending portion is first folded on the surface upward side of the main mirror by the movable portion and the auxiliary mirror is then moved when the auxiliary mirror is moved from the initial state to the external opening state. Thus, no outside end portion of the auxiliary mirror comes in contact with the surface of the room mirror and the auxiliary mirror can be freely set to the external opening state.

It is not necessary to arrange the surface of the main mirror in a position greatly separated from the existing room mirror. Accordingly, the driver and the other persons riding in the vehicle have no feeling of physical disorder and a forward appearance of the vehicle room can be improved.

Further, the wide room mirror can be made light in weight and a stabler attaching state of the wide room mirror can be obtained.

A connecting position of the auxiliary mirror and the extending portion can be arbitrarily determined if the connecting position is located on the rear side of the auxiliary mirror. Accordingly, a degree of freedom in design can be increased.

Further, a position and an angle of the auxiliary mirror with respect to the main mirror are set by both a folding angle of the extending portion on its end tip side folded by the movable portion and an external opening angle of the auxiliary mirror opened by the connecting portion. Accordingly, a degree of setting freedom of the auxiliary mirror is increased and a region reflected on the auxiliary mirror can be set to have a wider angle in a wide range.

A storing concave portion for storing the extending portion in the initial state can be formed on the rear face side of the auxiliary mirror.

In such a structure, the auxiliary mirror can be simply and suitably returned to the initial state by storing the extending portion into the storing concave portion so that operability is improved.

The connecting member can detachably connect the main mirror and the auxiliary mirror to each other.

In such a structure, when one of the main mirror and the auxiliary mirror is damaged, it is sufficient to exchange only the damaged one so that it is economical.

The connecting portion can be constructed by a simple structure when the connecting portion is constructed by a supporting spherical portion formed in one of the extending portion and the auxiliary mirror, and a supporting concave portion formed in the other of the extending portion and the auxiliary mirror and storing and supporting the supporting spherical portion in a movable state.

BRIEF DESCRIPTION OF THE DRAWINGS

FIG. 1 is a rear view showing an initial state of a wide room mirror in accordance with a first embodiment form.

FIG. 2 is a surface view of the wide room mirror of FIG. 1.

FIG. 3 is a plan view showing an initial state in which the wide room mirror of FIG. 1 is attached to an existing room mirror.

DESCRIPTION OF THE PREFERRED EMBODIMENTS

A first embodiment of this invention will next be described in detail on the basis of FIGS. 1 to 7.

Figure 4:
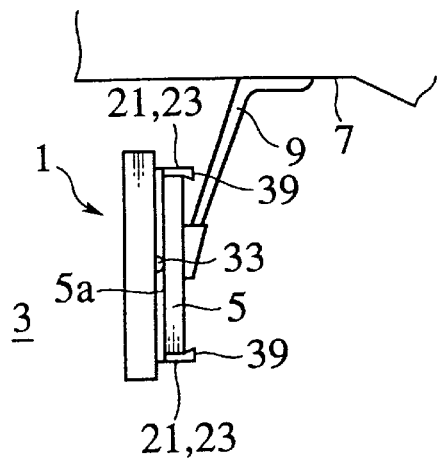
FIG. 4 is a side view showing the initial state of FIG. 3.
Figure 5:
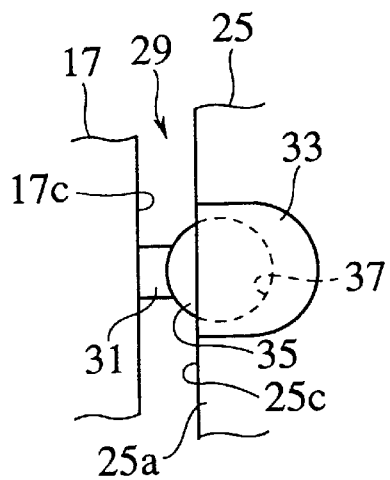
FIG. 5 is an enlarged view showing a main portion of FIG. 1.
Figure 6:
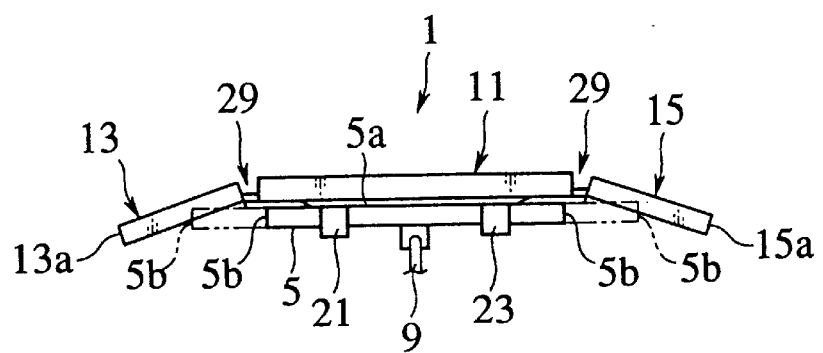
FIG. 6 is a plan view showing a using state in which an auxiliary mirror is inclined from the initial state of FIG. 3.
Figure 7:
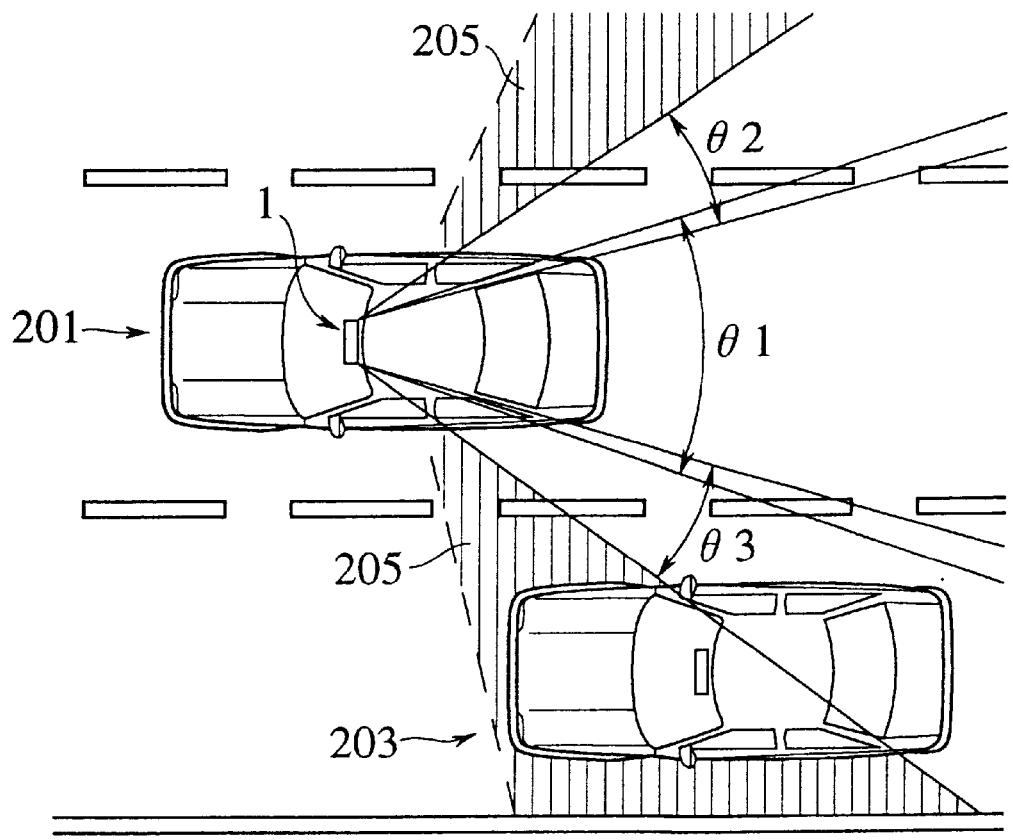
FIG. 7 is a plan view showing a backward viewing field of a vehicle mounting the wide room mirror of FIG. 1 thereon.

FIG. 1 is a rear view showing an initial state of a wide room mirror in accordance with this embodiment form. FIG. 2 is a surface view of the wide room mirror of FIG. 1. FIG. 3 is a plan view showing an initial state in which the wide room mirror of FIG. 1 is attached to an existing room mirror. FIG. 4 is a side view showing the initial state of FIG. 3. FIG. 5 is an enlarged view showing a main portion of FIG. 1. FIG. 6 is a plan view showing a using state in which an auxiliary mirror is inclined from the initial state of FIG. 3. FIG. 7 is a plan view showing a backward viewing field of a vehicle mounting the wide room mirror of FIG. 1 thereon.

As shown in FIG. 4, a wide room mirror 1 in this embodiment form is attached to an existing room mirror 5 arranged in a front upper portion of a vehicle within a vehicle room 3 and is used. The existing room mirror 5 is movably connected to an arm 9 fastened and fixed to a room inner face 7 and is supported by this arm 9.

As shown in FIGS. 1 to 3, the wide room mirror 1 is constructed by one main mirror 11 and two auxiliary mirrors 13, 15. The auxiliary mirrors 13, 15 are movably connected to the main mirror 11 through a connecting member 29 and are supported by this main mirror 11.

The main mirror 11 is constructed by a main mirror holding plate 17 and a mirror body 19 formed in the shape of a thin plate. The main mirror holding plate 17 is injection-molded in the shape of a plate body by hard resin. The mirror body 19 is joined onto the side of a front face 17b of the main mirror holding plate 17 by an adhesive or an adhesive double coated tape, etc. Two pairs of attaching portions 21, 23 are respectively projected on the left-hand and right-hand sides of a rear face 17a of the main mirror holding plate 17.

These two pairs of attaching portions 21, 23 are vertically spaced from each other and are opposed to each other. Each of the attaching portions 21, 23 has a flexible property. As shown in FIG. 4, a claw portion 39 is formed in an end tip portion of each of the attaching portions 21, 23 and is projected toward an opposite one of the attaching portions 21, 23. When the claw portion 39 of each of the lower attaching portions 21, 23 is engaged with the rear side of a lower edge portion of the existing room mirror 5 and an upper portion of the main mirror 11 is pressed on a side of the existing room mirror 5, the upper and lower attaching portions 21, 23 are flexed and allow a movement of the main mirror 11. Thus, the claw portion 39 of each of the lower attaching portions 21, 23 is engaged with the rear side of an upper edge portion of the room mirror 5 and the attaching portions 21, 23 support the room mirror 5 therebetween in a width direction (vertical direction). In this nipping-supporting state, the main mirror 11 is detachably attached such that a surface 5a of the room mirror 5 is covered with the main mirror 11. The upper attaching portions 21, 23 may be first engaged in the attachment of the main mirror 11.

Each of the auxiliary mirrors 13, 15 is constructed by an auxiliary mirror holding plate 25 injection-molded in the shape of a plate body by hard resin, and a mirror body 27 formed in the shape of a thin plate and joined onto the side of a front face 25b of the auxiliary mirror holding plate 25 by an adhesive, etc.

A connecting member 29 detachably and movably connects each of both side faces 17c of the main mirror holding plate 17 in a longitudinal direction (a width direction of the vehicle) thereof to a side face 25c of nipping-supporting-the auxiliary mirror holding plate 25. As shown in FIG. 5, the connecting member 29 is constructed by a shaft bar 31, a supporting spherical portion 35 and a supporting concave portion 37. The shaft bar 31 is integrally projected from each of the side faces 17c of the main mirror holding plate 17. The supporting spherical portion 35 is formed at an end tip of the shaft bar 31 and approximately has a spherical body shape. The supporting concave portion 37 is formed in the interior of the side face 25c of the auxiliary mirror holding plate 25 and is opened to this side face 25c. The supporting concave portion 37 is approximately formed in the shape of a spherical hole for storing a portion equal to or greater than at least a half of the supporting spherical portion 35. A rising portion 33 is projected on the rear side of a portion of the auxiliary mirror holding plate 25 in which the supporting concave portion 37 is formed. The rising portion 33 is formed to reinforce a circumference of the supporting concave portion 37 by partially increasing a thickness of the auxiliary mirror holding plate 25. When the supporting spherical portion 35 is pushed from the opening into the supporting concave portion 37, the supporting spherical portion 35 is stored into the supporting concave portion 37 and is slidably supported by this supporting concave portion 37.

The main mirror 11 and each of the auxiliary mirrors 13, 15 are connected to each other by such a connecting member 29 such that each of these mirrors can be moved from an initial state (see FIGS. 2 and 3) to a using state (see FIG. 6). In the initial state, the mirror body 19 of the main mirror 11 and the mirror bodies 27 of both the auxiliary mirrors 13, 15 are approximately located on the same face. In the using state, the auxiliary mirrors 13, 15 are inclined with respect to the main mirror 11.

An operation of the wide room mirror in this embodiment form will next be explained.

When a driver takes a driver's seat, the driver entirely moves the main mirror 11 and the room mirror 5 and sets inclination angles of these mirrors to desirable angles. Thereafter, as shown in FIG. 6, the auxiliary mirrors 13, 15 are inclined by desirable angles with respect to the main mirror 11. In this case, inclining directions of the auxiliary mirrors 13, 15 are set to directions in which both end portions 13a, 15a of the auxiliary mirrors 13, 15 in the width direction of a vehicle are projected onto a front side of the vehicle (a rear face side of the main mirror 11). Concretely, for example, the inclining directions of the auxiliary mirrors 13, 15 are set such that a right-hand side window of a rear seat of the vehicle is reflected on the right-hand side auxiliary mirror 13 and a left-hand side window of the rear seat of the vehicle is reflected on the left-hand side auxiliary mirror 15.

Figure 29:
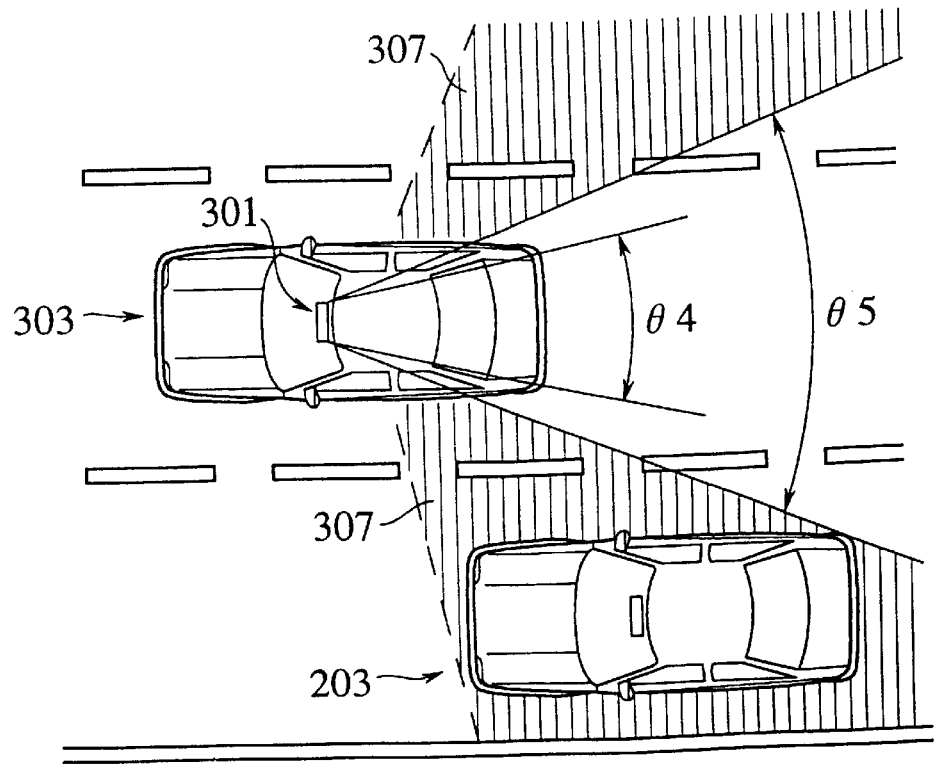
FIG. 29 is a plan view showing a backward viewing field of a vehicle using a conventional existing room mirror.

Thus, as shown in FIG. 7, a region θ 1 just behind the vehicle is reflected on the central main mirror 11 (see FIG. 2) with respect to the driver of the vehicle 201 attaching the wide room mirror 1 thereto. A right-hand slanting backward region θ 2 of the vehicle is reflected on the right-hand side auxiliary mirror 13 (see FIG. 2) facing a forward direction of the vehicle. A left-hand slanting backward region θ 3 of the vehicle is reflected on the left-hand side auxiliary mirror 15 (see FIG. 2) facing the forward direction of the vehicle. In contrast to this, a region reflected on the existing room mirror 5 is approximately equal to the region θ 1 just behind the vehicle reflected on the main mirror 11. Accordingly, the driver of the vehicle 201 can see a region having an angle and a range wider than those of a region reflected on only the existing room mirror 5 by using the auxiliary mirrors 13, 15. Therefore, it is possible to greatly reduce a dead angle region 205 unable to be seen in a normal driving posture in which the driver looks forward. Namely, the driver can recognize a slanting backward vehicle 203 completely located in a dead angle region 307 (see FIG. 29) by only the existing room mirror 5 in a state in which the driver's head is directed forward without turning the driver's head backward. Accordingly, safety at a driving time of the vehicle is greatly improved.

The wide room mirror 1 can be set to three forms of a one-face mirror, a two-face mirror and a three-face mirror. In the case of the one-face mirror, the auxiliary mirrors 13, 15 are set to initial states. In the case of the two-face mirror, only one of the auxiliary mirrors 13, 15 is set to an external opening state. In the case of the three-face mirror, both the auxiliary mirrors 13 and 15 on both sides of the main mirror are set to external opening states. The driver can suitably select and set a required form.

As explained above, in accordance with this embodiment, a sufficient backward viewing field can be obtained in a driving state in which the driver looks forward by a simple method and a simple construction of attaching the wide room mirror 1 to the existing room mirror 5. Thus, safety at the driving time of the vehicle can be greatly improved.

The wide room mirror 1 is constructed by the main mirror 11 and the auxiliary mirrors 13, 15 as a unit. Accordingly, it is sufficient to attach the entire wide room mirror 1 to the existing room mirror 5 so that an attaching work of the wide room mirror 1 is easily made.

Further, the connecting member 29 detachably connects the main mirror 11 and each of the auxiliary mirrors 13, 15 to each other. Accordingly, when one of the main mirror 11 and the auxiliary mirrors 13, 15 is damaged, it is sufficient to exchange only the damaged one without exchanging all these mirrors so that it is economical.

Figure 8:
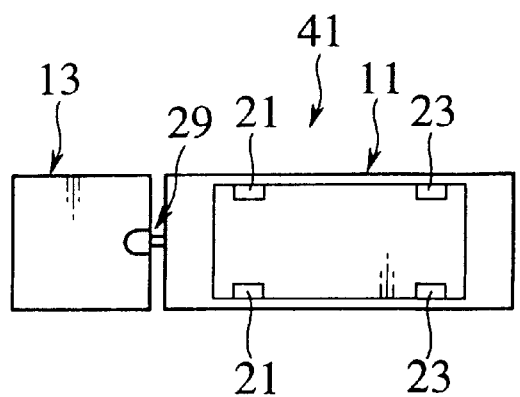
FIG. 8 is a rear view showing a modified example of the wide room mirror of FIG. 1 in which only one auxiliary mirror is arranged.
Figure 9:
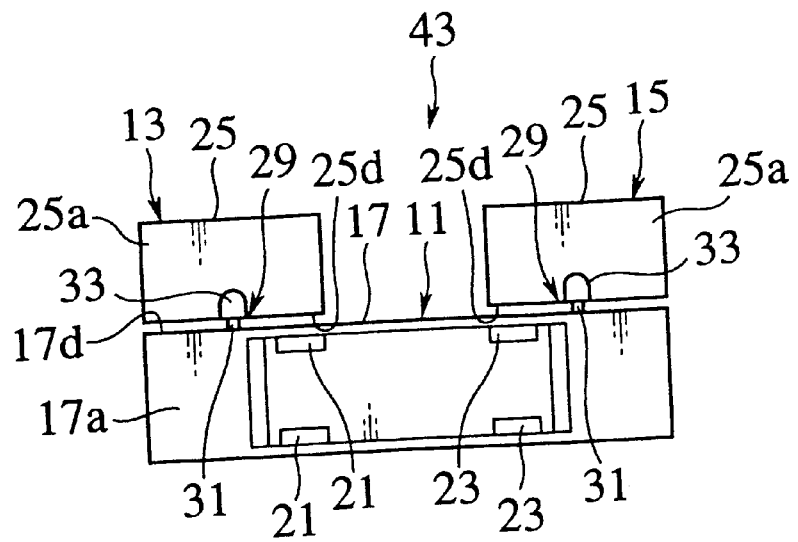
FIG. 9 is a rear view showing a modified example of the wide room mirror of FIG. 1 in which the auxiliary mirror is arranged above a main mirror in parallel with this main mirror.
Figure 10:
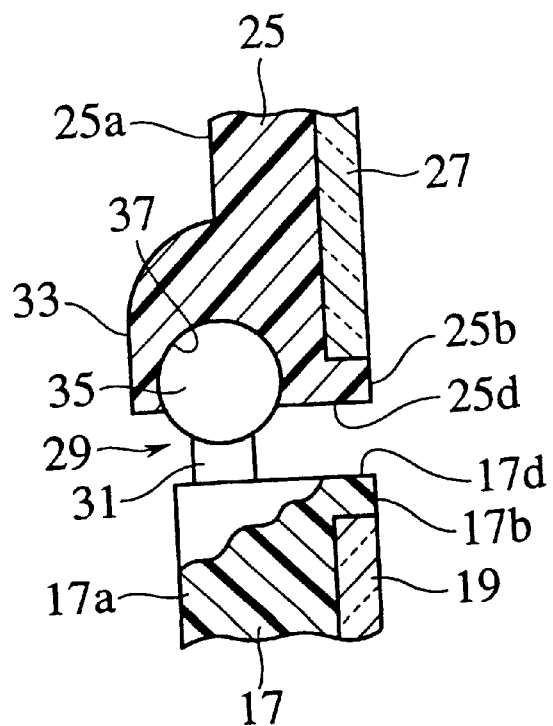
FIG. 10 is an enlarged sectional view showing a main portion of FIG. 9.
Figure 11:
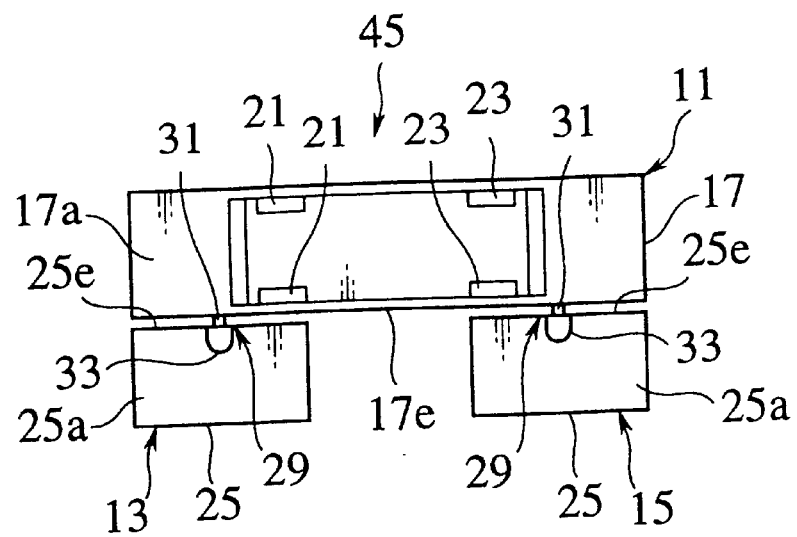
FIG. 11 is a rear view showing a modified example of the wide room mirror of FIG. 1 in which the auxiliary mirror is arranged below the main mirror in parallel with this main mirror.
Figure 12:
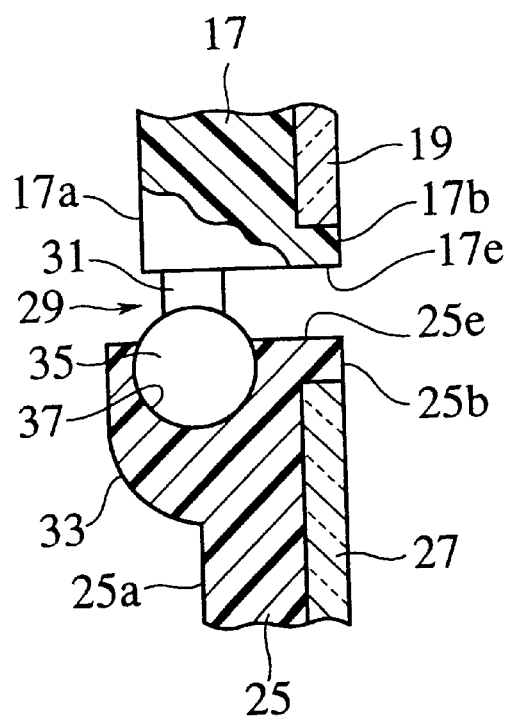
FIG. 12 is an enlarged sectional view showing a main portion of FIG. 11.

In this embodiment form, the auxiliary mirrors 13, 15 are arranged on the left-hand and right-hand sides of the main mirror 11 in the width direction of the vehicle. However, only one auxiliary mirror 13 can be arranged (see a wide room mirror 41 shown in FIG. 8). The auxiliary mirrors 13, 15 can be also arranged above the main mirror 11 in parallel with this main mirror 11 (see a wide room mirror 43 in FIG. 9). The auxiliary mirrors 13, 15 can be also arranged below the main mirror 11 in parallel with this main mirror 11 (see a wide room mirror 45 in FIG. 11). When the auxiliary mirrors 13, 15 are arranged above the main mirror 11 in parallel with this main mirror 11, as shown in FIG. 10, the shaft bar 31 is integrally projected from an upper side face 17d of the main mirror holding plate 17, and a supporting concave portion 37 is formed in the interior of a lower side face 25d of the auxiliary mirror holding plate 25 opposed to the main mirror holding plate 17. When the auxiliary mirrors 13, 15 are arranged below the main mirror 11 in parallel with this main mirror 11, as shown in FIG. 12, the shaft bar 31 is integrally projected from a lower side face 17e of the main mirror holding plate 17, and a supporting concave portion 37 is formed in the interior of an upper side face 25e of the auxiliary mirror holding plate 25 opposed to the main mirror holding plate 17.

A second embodiment form of the present invention will next be described in detail on the basis of FIGS. 13 to 18.

Figure 13:
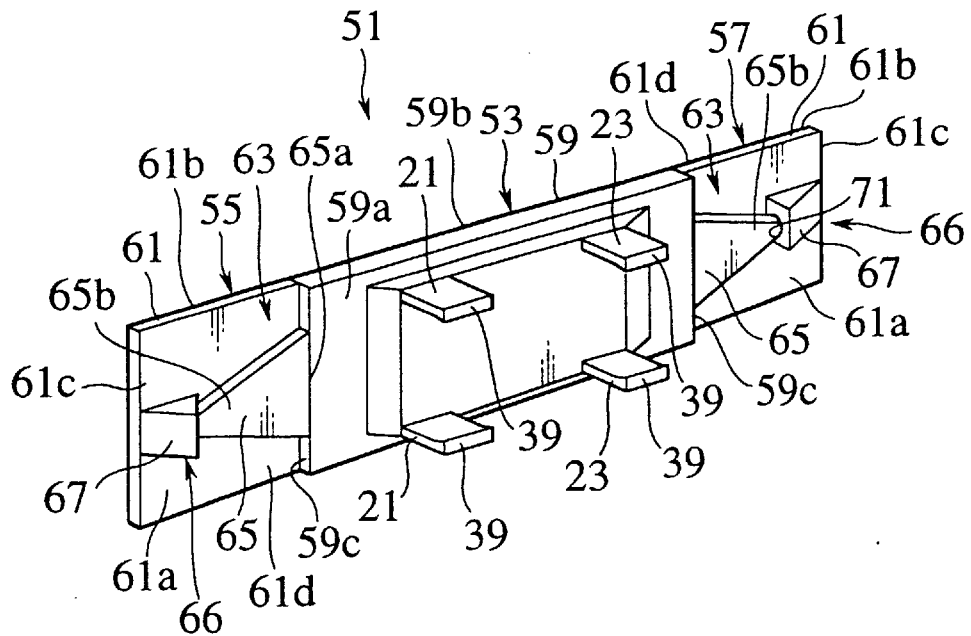
FIG. 13 is a perspective view showing an initial state of a wide room mirror in accordance with a second embodiment form.
Figure 14:
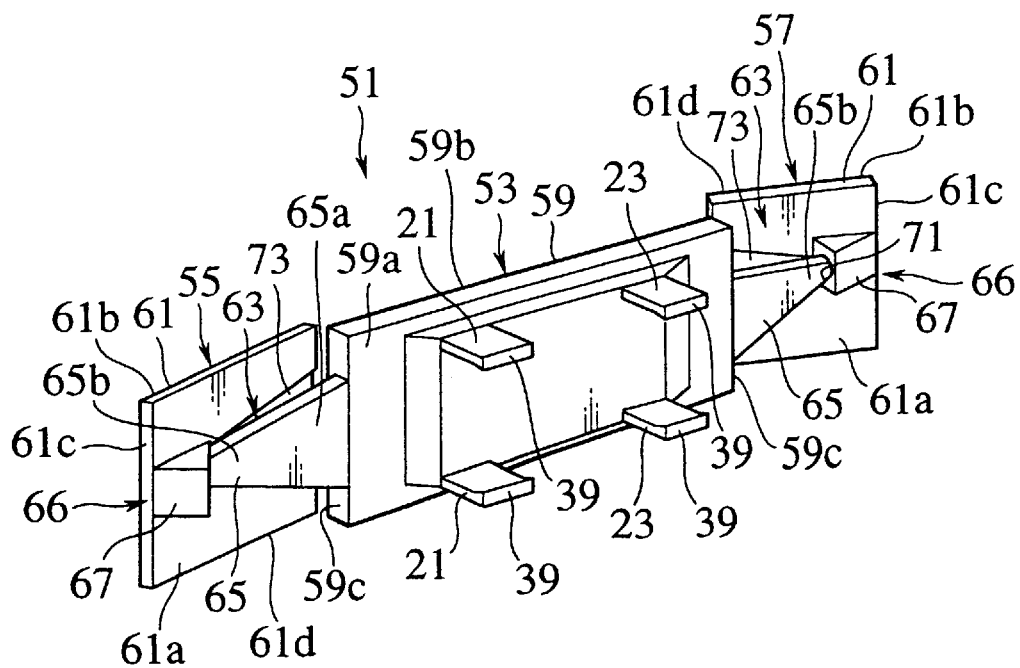
FIG. 14 is a perspective view showing an external opening state of the wide room mirror of FIG. 13.
Figure 15:
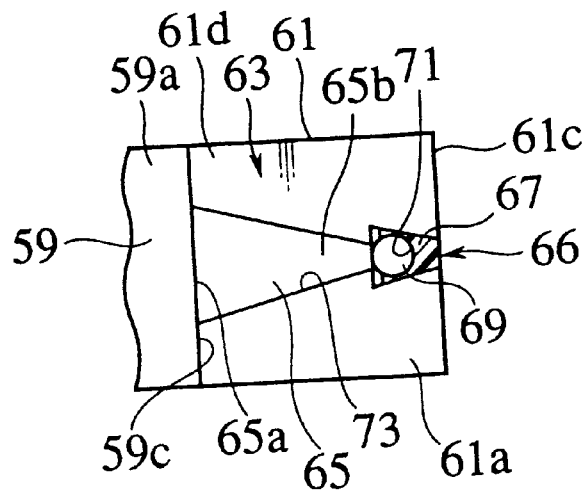
FIG. 15 is a partial sectional view showing a connecting portion of the wide room mirror of FIG. 13 seen from a rear face of this wide room mirror.
Figure 16:
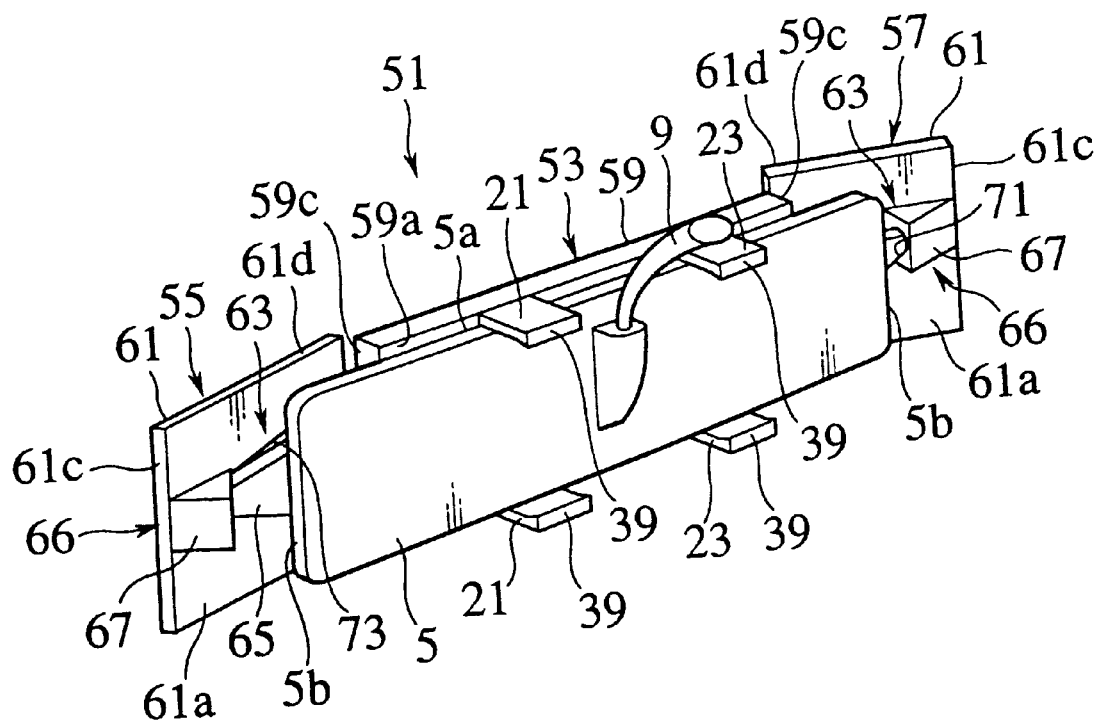
FIG. 16 is a perspective view showing a state in which the wide room mirror of FIG. 13 is attached to an existing room mirror.
Figure 17:
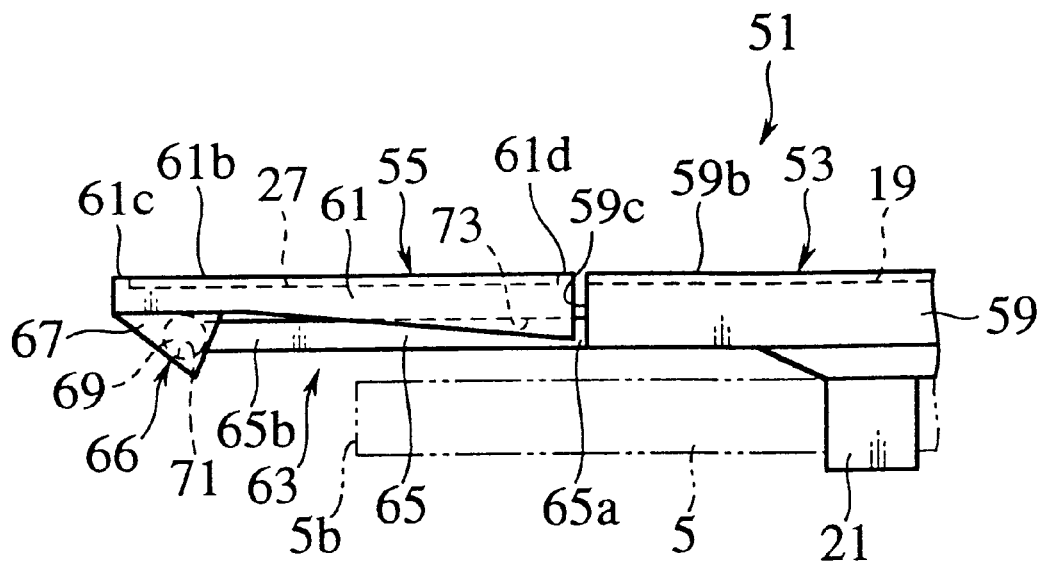
FIG. 17 is a plan view showing an initial state of the wide room mirror of FIG. 13.
Figure 18:
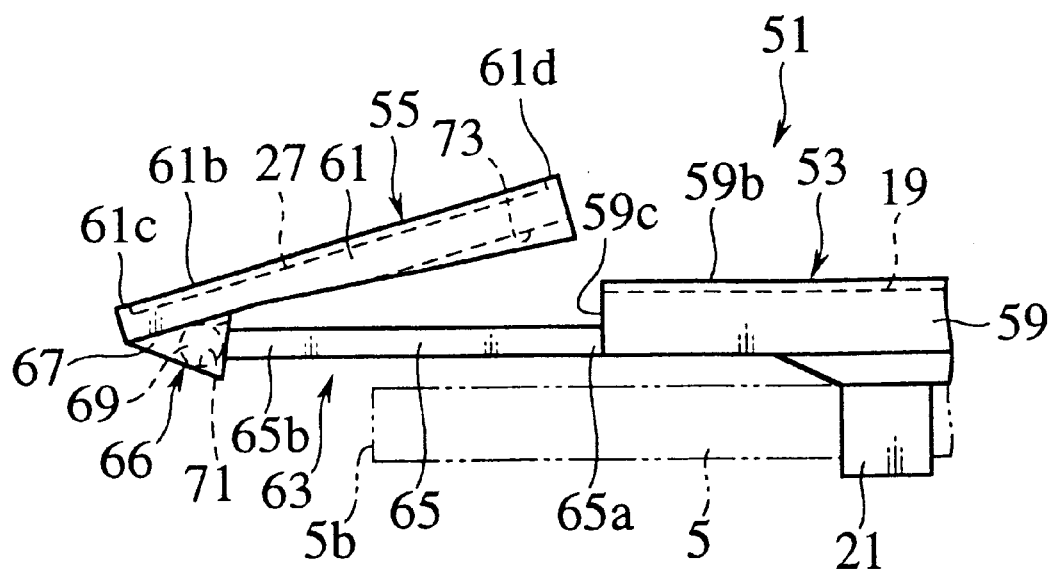
FIG. 18 is a plan view showing the external opening state of the wide room mirror of FIG. 13.

FIG. 13 is a perspective view showing an initial state of a wide room mirror in accordance with this embodiment form. FIG. 14 is a perspective view showing an external opening state of the wide room mirror of FIG. 13. FIG. 15 is a partial sectional view showing a connecting portion of the wide room mirror of FIG. 13 seen from a rear face of this wide room mirror. FIG. 16 is a perspective view showing a state in which the wide room mirror of FIG. 13 is attached to an existing room mirror. FIG. 17 is a plan view showing an initial state of the wide room mirror of FIG. 13. FIG. 18 is a plan view showing the external opening state of the wide room mirror of FIG. 13. In these figures, constructional portions similar to those in the above first embodiment form are designated by the same reference numerals and their explanations are omitted in the following description.

The wide room mirror 51 in this embodiment form is also attached to the existing room mirror 5 and is used.

As shown in FIGS. 13 and 14, the wide room mirror 51 is constructed by one main mirror 53 and two auxiliary mirrors 55, 57. Each of the auxiliary mirrors 55, 57 is movably connected to the main mirror 53 through a connecting member 63 and is supported by this main mirror 53.

The main mirror 53 is constructed by a main mirror holding plate 59 and a mirror body 19 (see FIG. 17). The main mirror holding plate 59 is injection-molded in a plate body shape by hard resin. The mirror body 19 is joined to the side of a front face 59b of the main mirror holding plate 59 by an adhesive, an adhesive double coated tape, etc., and is formed in the shape of a thin plate. Two pairs of attaching portions 21, 23 for attaching the wide room mirror 51 to the existing room mirror 5 are projected on the side of a rear face 59a of the main mirror holding plate 59.

Each of the auxiliary mirrors 55, 57 is constructed by an auxiliary mirror holding plate 61 and a mirror body 27 (see FIG. 17). The auxiliary mirror holding plate 61 is injection-molded in a plate body shape by hard resin. The mirror body 27 is joined to the side of a front face 61b of the auxiliary mirror holding plate 61 by an adhesive, etc., and is formed in the shape of a thin plate.

The connecting member 63 has an extending portion 65 and a connecting portion 66.

The extending portion 65 extends on an outer side in the width direction of the vehicle along a plate face direction (a direction approximately parallel to the mirror body 19) of the main mirror 53 from each of both side faces 59c of the main mirror holding plate 59 as circumferential edge portions of the main mirror 53 in a longitudinal direction (the vehicle width direction) of the main mirror holding plate 59. The extending portion 65 is approximately formed in the shape of a triangular plate body. The extending portion 65 is integrally projected from the main mirror holding plate 59 such that one bottom side of the extending portion 65 constitutes a base end portion 65a and a top side of the extending portion 65 opposed to this bottom side constitutes an end tip portion 65b.

The connecting portion 66 is constructed by a supporting spherical portion 69 and a supporting concave portion 71. The connecting portion 66 detachably and movably connects the end tip portion 65b of the extending portion 65 onto the side of a rear face 61a of the auxiliary mirror holding plate 61.

The supporting spherical portion 69 is approximately formed in the shape of a spherical body and is formed integrally with the end tip portion 65b of the extending portion 65. A rising portion 67 is projected from an end portion 61c outside (outside the vehicle width direction) the rear face 61a of the auxiliary mirror holding plate 61 located in a position farthest from the main mirror 53 in an extending direction of the extending portion 65. The supporting concave portion 71 is formed in the rising portion 67. As shown in FIG. 15, the supporting concave portion 71 is approximately formed in the shape of a spherical hole for storing a portion equal to or greater than at least a half of the supporting spherical portion 69. An inner side of the supporting concave portion 71 in the vehicle width direction is opened. When the supporting spherical portion 69 is pushed from the opening into the supporting concave portion 71, the supporting spherical portion 69 is stored into the supporting concave portion 71 and is slidably supported by the supporting concave portion 71.

Each of the auxiliary mirrors 55, 57 can be moved by such a connecting member 66 from an initial state (see FIGS. 13 and 17) to an external opening state (see FIGS. 14 and 18). In the initial state, an inside end portion 61d (on an inner side in the vehicle width direction) of the auxiliary mirror holding plate 61 located on a side opposed to the supporting concave portion 71 is located in most proximity to an outside end portion 59c of the main mirror holding plate 59, and the mirror body 27 of each of the auxiliary mirrors 55, 57 is approximately located on the same face as the mirror body 19 of the main mirror 53. In the external opening state, the inside end portion 61d of the auxiliary mirror holding plate 61 is projected on a surface upward side (on a rear side of the vehicle) of the main mirror holding plate 59, and the mirror body 27 of each of the auxiliary mirrors 55, 57 is inclined with respect to the mirror body 19 of the main mirror 53. It is preferable to locate the auxiliary mirrors 55, 57 in proximity to the main mirror 53 as much as possible in the initial state such that the mirror body 19 of the main mirror 53 and the mirror bodies 19, 27 of the auxiliary mirrors 55, 57 are approximately located on the same continuous face.

Further, a storing concave portion 73 for storing the extending portion 65 in the initial state is formed on the side of the rear face 61a of the auxiliary mirror holding plate 61.

An operation of the wide room mirror in this embodiment form will next be explained.

Similar to the wide room mirror 1 in the above first embodiment form, with respect to the wide room mirror 51 in this second embodiment form, the main mirror 53 and the room mirror 5 are entirely moved and are set to desirable inclination angles when a driver takes a driver's seat. Thereafter, each of the auxiliary mirrors 55, 57 is set to an external opening state by inclining each of the auxiliary mirrors 55, 57 by a desirable angle with respect to the main mirror 53.

Thus, the driver can see a region having an angle and a range wider than those of a region reflected on only the existing room mirror 5 by using the auxiliary mirrors 55, 57 so that safety at a driving time of the vehicle is greatly improved.

Further, the connecting portion 66 detachably connects the extending portion 65 to each of the auxiliary mirrors 55, 57. Accordingly, when one of the main mirror 53 and the auxiliary mirrors 55, 57 is damaged, it is sufficient to exchange only the damaged one without exchanging all the mirrors so that it is economical.

As shown in FIG. 5, each of the both side faces 17c of the main mirror holding plate 17 in its longitudinal direction (vehicle width direction) is connected to the side face 25c of the auxiliary mirror holding plate 25 by the connecting member 29 in the above first embodiment form. Accordingly, when the existing room mirror 5 is shorter than the main mirror 11 and no outside end portion 5b of the room mirror 5 reaches a rear face side of the connecting member 29 (in a state shown by a solid line in FIG. 6), each of the auxiliary mirrors 13, 15 can be freely set to the external opening state. However, when the existing room mirror 5 is longer than the main mirror 5 and the outside end portion 5b of the room mirror 5 reaches the rear face side of the connecting member 29 (in a state shown by a two-dotted chain line in FIG. 6), the rear face side of each of the auxiliary mirrors 13, 15 comes in contact with the outside end portion 5b of the room mirror 5 so that each of the auxiliary mirrors 13, 15 cannot be freely set to the external opening state. The thickness of the main mirror 11 is increased and the connecting member 29 is greatly separated from the surface of the room mirror 5 to sufficiently obtain the external opening state with respect to each of the auxiliary mirrors 13, 15 without having any influence of the room mirror 5. Otherwise, main mirrors 11 having plural kinds of lengths each according to the length of the room mirror 5 must be prepared to sufficiently obtain the external opening state with respect to each of the auxiliary mirrors 13, 15 without having any influence of the room mirror 5.

In contrast to this, in this embodiment form, the outside end portion 61c of the auxiliary mirror holding plate 61 is connected to the end tip portion 65b of the extending portion 65 by the connecting portion 66. Accordingly, as shown in FIG. 16, the connecting portion 66 is located outside by the(extending portion 65 and it is possible to set a state in which no outside end portion 5b of the room mirror 5 reaches the rear face side of the connecting portion 66 even when the room mirror 5 is longer than the main mirror 51. Accordingly, each of the auxiliary mirrors 55, 57 can be freely set to the external opening state.

Further, there is a case in which the room mirror 5 is longer than a length obtained by adding the extending portions 65 on both sides of the main mirror 53 to this main mirror 53, and the outside end portion 5b of the room mirror 5 reaches the rear face side of the connecting portion 66, and the connecting portion 66 is in proximity to the surface of the room mirror 5. The auxiliary mirror holding plate 61 is rotated with its outside end portion 61c as an approximate center even in this case when each of the auxiliary mirrors 55, 57 is moved from the initial state to the external opening state. Therefore, no outside end portion 61c of the auxiliary mirror holding plate 61 comes in contact with the surface of the room mirror 5 so that each of the auxiliary mirrors 55, 57 can be freely set to the external opening state.

Accordingly, the same wide room mirror 51 can be used with respect to room mirrors 5 having different lengths in the vehicle width direction even when the wide room mirror 51 is entirely formed thinly. Therefore, the wide room mirror 51 can be set to have a high wide using property.

Since the main mirror 53 can be thinly formed, the mirror body 19 of the main mirror 53 can be arranged in proximity to the existing room mirror 5. Accordingly, a distance from a driver's eye to the mirror face 19 of the main mirror 53 can be set to be approximately equal to a distance from the driver's eye to the room mirror 5. Therefore, the region of a viewing field reflected on the main mirror 53 can be approximately similar to that reflected on the room mirror 5. Accordingly, the wide room mirror 51 can be used by same feeling as the existing room mirror 5. Further, since the wide room mirror 51 can be entirely formed thinly, the driver and the other persons riding in a vehicle have no feeling of physical disorder and a forward appearance of a vehicle room can be improved.

Further, the wide room mirror 51 can be made light in weight and a stable attaching state of the existing room mirror 5 can be obtained without reinforcing the attaching state of the existing room mirror 5 onto a vehicle body side.

Each of the auxiliary mirrors 55, 57 can be simply returned to the initial state by storing the extending portion 65 into the storing concave portion 73 so that operability is improved.

Further, the connecting portion 66 can be constructed by a simple structure since the connecting portion 66 is constructed by the supporting spherical portion 69 formed in the extending portion 65 and the supporting concave portion 71 formed in the rising portion 67.

Figure 19:
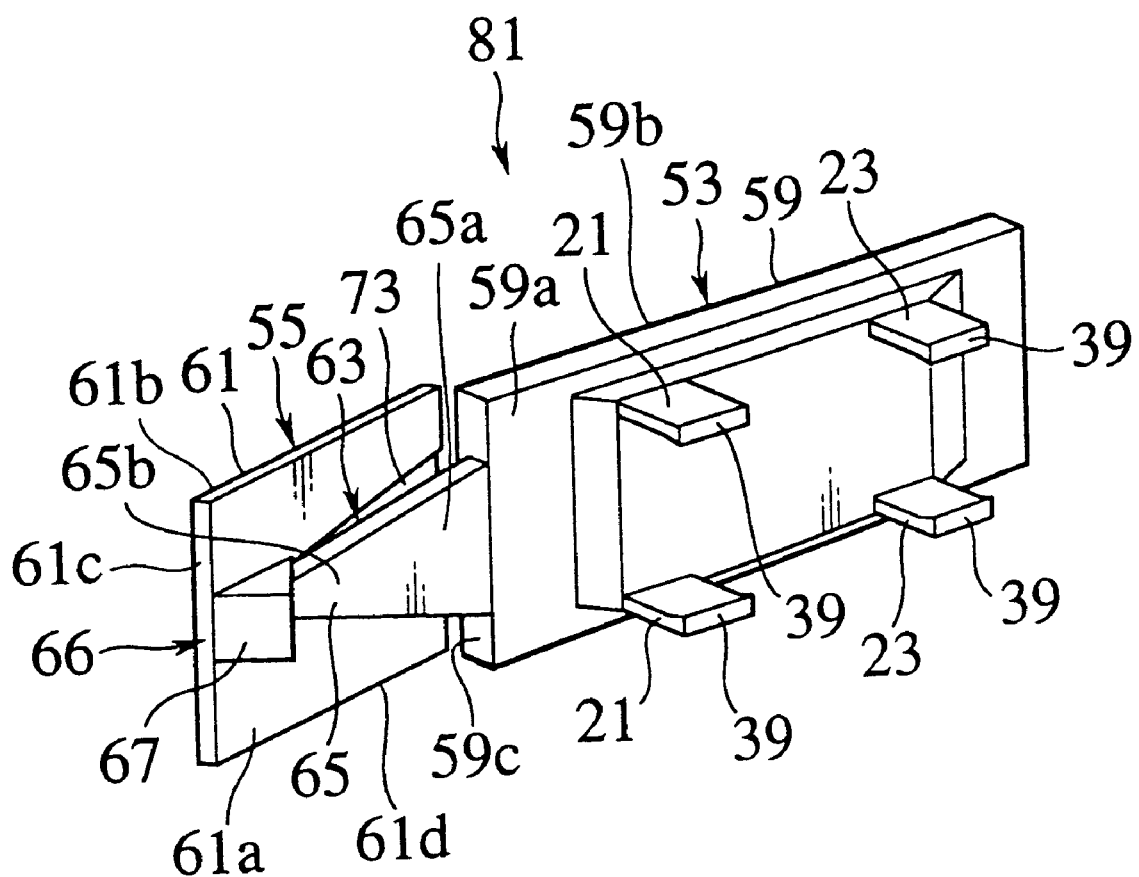
FIG. 19 is a perspective view showing a modified example of the wide room mirror of FIG. 13 in which only one auxiliary mirror is arranged.

In this embodiment form, the auxiliary mirrors 55, 57 are arranged on the left-hand and right-hand sides of the main mirror 53 in the vehicle width direction. However, only one auxiliary mirror 55 can be arranged (see a wide room mirror 81 shown in FIG. 19), or the auxiliary mirrors 55, 57 can be arranged above or below the main mirror 53 (this construction is omitted in the drawings).

In this embodiment form, the rising portion 67 is formed on the rear face 61a of the auxiliary mirror holding plate 61, and the auxiliary mirror holding plate 61 is connected to the extending portion 65 in this rising portion 67. However, no connecting portion of the auxiliary mirror holding plate 61 and the extending portion 65 may be directly formed on the rear face 61a of the auxiliary mirror holding plate 61. For example, the auxiliary mirror holding plate 61 can be connected to the extending portion 65 in a projecting portion projected from a side face of the outside end portion 61c of the auxiliary mirror holding plate 61 toward the side of the rear face 61a.

A third embodiment form of the present invention will next be described in detail on the basis of FIGS. 20 to 23.

Figure 20:
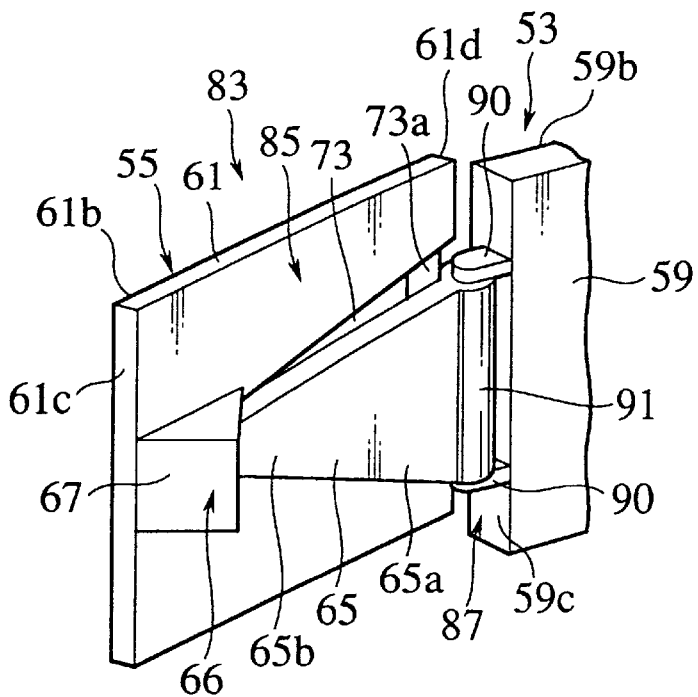
FIG. 20 is a perspective view showing a main portion of a wide room mirror in accordance with a third embodiment form.
Figure 21:
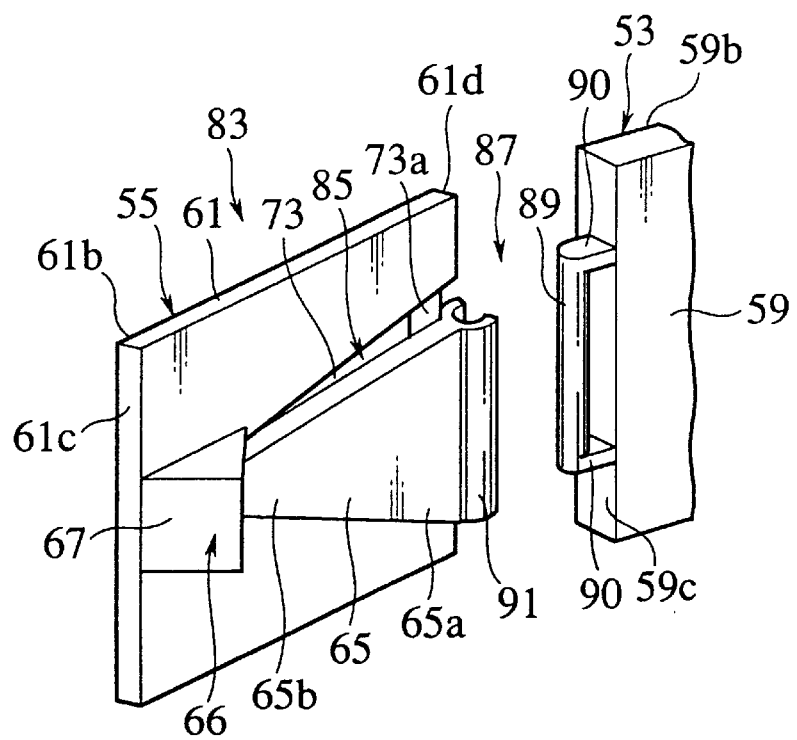
FIG. 21 is an exploded perspective view showing the wide room mirror of FIG. 20.
Figure 22:
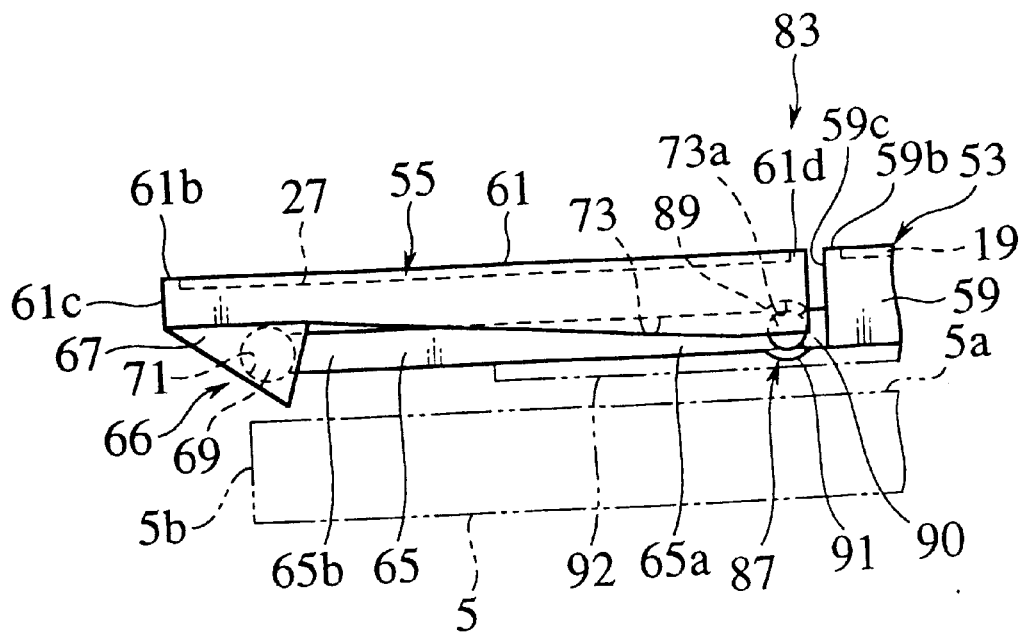
FIG. 22 is a plan view showing an initial state of the wide room mirror of FIG. 20.
Figure 23:
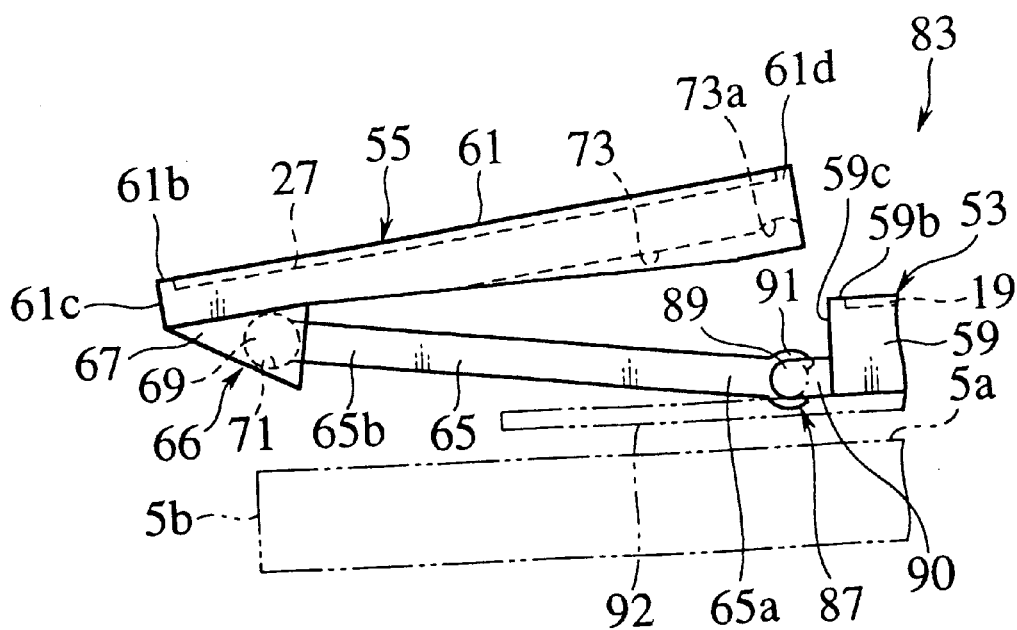
FIG. 23 is a plan view showing an external opening state of the wide room mirror of FIG. 20.

FIG. 20 is a perspective view showing a main portion of a wide room mirror in accordance with this embodiment form. FIG. 21 is an exploded perspective view showing the wide room mirror of FIG. 20. FIG. 22 is a plan view showing an initial state of the wide room mirror of FIG. 20. FIG. 23 is a plan view showing an external opening state of the wide room mirror of FIG. 20. Constructional portions similar to those in the above first and second embodiment forms are designated by the same reference numerals and their explanations are omitted in the following description. In FIGS. 20 to 23, only one auxiliary mirror is shown, but a connecting member connected to the other auxiliary mirror also has a similar construction.

As shown in FIGS. 20 to 23, a connecting portion 85 differs from the connecting portion in the second embodiment form in that the wide room mirror 83 in this embodiment form has a movable portion 87 formed between a base end portion 65a of an extending portion 65 and a main mirror holding plate 59. The movable portion 87 allows the side of an end tip portion 65b of the extending portion 65 to be folded onto the surface upward side (the rear side of a vehicle) of a main mirror 53.

The movable portion 87 is constructed by an engaging portion 91 and a supporting shaft portion 89. The engaging portion 91 is formed integrally with the base end portion 65a of the extending portion 65. The supporting shaft portion 89 is projected from a side face 59c of the main mirror holding plate 59. The engaging portion 91 has a flexible property and is approximately formed in a U-shape in cross section in which one portion of an approximately cylindrical body extending along one bottom side of the base end portion 65a of the extending portion 65 is notched along this bottom side. The supporting shaft portion 89 is approximately formed in a columnar shape extending along a side face 59a of the main mirror holding plate 59 such that the supporting shaft portion 89 is separated by a predetermined clearance from the side face 59c of the main mirror holding plate 59. Each of both end portions 90 of the supporting shaft portion 89 is connected to the side face 59c so that the supporting shaft portion 89 is supported by this side face 59c. When a notch portion of the engaging portion 91 comes in contact with the supporting shaft portion 89 and an auxiliary mirror holding plate 61 is pressed onto a side of the main mirror holding plate 59, the supporting shaft portion 89 is pressed and stored into the engaging portion 91 and the engaging portion 91 is rotatably supported with the supporting shaft portion 89 as a center. Thus, the side of the end tip portion 65b of the extending portion 65 can be freely rotated by such a movable portion 87 such that this end tip portion 65b is folded on the surface upward side (the rear side of the vehicle) of the main mirror 53 with the supporting shaft portion 89 as a center.

A deep groove portion 73a is formed in a storing concave portion 73 such that a shape of this deep groove portion 73a is in conformity with an outer circumferential shape of the engaging portion 91.

When the auxiliary mirror 55 is moved from an initial state (see FIG. 22) to an external opening state in the case of such a connecting member 85, the side of the end tip portion 65b of the extending portion 65 is first folded on the surface upward side (the rear side of the vehicle) of the main mirror 53 by the movable portion 87 as shown in FIG. 23 and the auxiliary mirror 55 is moved.

Accordingly, an outside end portion 61c of the auxiliary mirror holding plate 61 is separated from the surface 5a of a room mirror 5 even when the connecting portion 66 is in proximity to the surface 5a of the room mirror 5 in a state in which the wide room mirror 83 is attached to the existing room mirror 5. Accordingly, it is more reliably avoidable that the outside end portion 61c of the auxiliary mirror holding plate 61 comes in contact with the surface 5a of the room mirror 5. Therefore, the auxiliary mirror 55 can be freely set to the external opening state.

Figure 24:
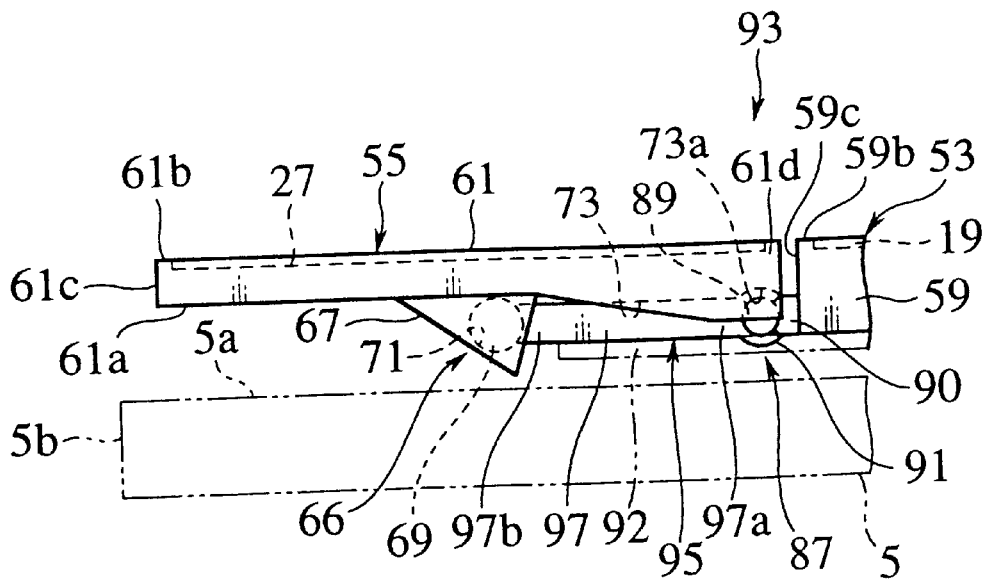
FIG. 24 is a plan view showing the initial state in a modified example of the wide room mirror of FIG. 20.
Figure 25:
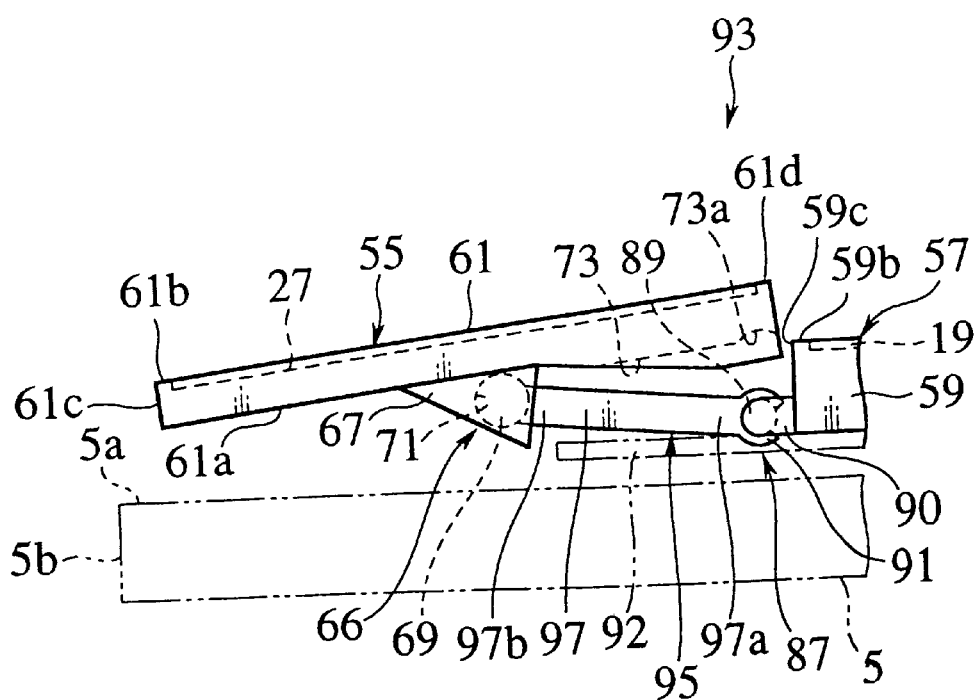
FIG. 25 is a plan view showing the external opening state in a modified example of the wide room mirror of FIG. 20.

When such a movable portion 87 is formed, a position of the connecting portion 66 is not limited to that of the outside end portion 61c of the auxiliary mirror holding plate 61 as in the above second embodiment form, but can be set to an arbitrary position if the connecting portion 66 is formed on the side of a rear face 61a of the auxiliary mirror holding plate 61. For example, as shown in FIGS. 24 and 25, the connecting portion 66 can be formed in an intermediate portion of the auxiliary mirror holding plate 61 on the side of the rear face 61a thereof. In such a wide room mirror 93, an extending portion 97 is shortened in comparison with the above wide room mirror 91, but the engaging portion 91 is similarly formed in a base end portion 97a of the extending portion 97. Further, a supporting spherical portion 69 is similarly formed in an end tip portion 97b of the extending portion 97. When the connecting portion 66 is formed in the intermediate portion of the auxiliary mirror holding plate 61 on the side of the rear face 61a thereof and the auxiliary mirror 55 is moved from the initial state (see FIG. 24) to the external opening state, a side of the end tip portion 97b of the extending portion 97 is first folded by the movable portion 87 on the surface upward side (the rear side of the vehicle) of the main mirror 53 as shown in FIG. 25, and the auxiliary mirror 55 is moved. Thus, the outside end portion 61c of the auxiliary mirror holding plate 61 is separated from avoidable that the outside end portion 61c of the auxiliary mirror holding plate 61 comes in contact with the surface 5a of the room mirror 5. Therefore, the auxiliary mirror 55 can be freely set to the external opening state.

Further, no arranging position of the movable portion 87 is limited to each of positions of the base end portions 65a, 97a of the extending portions 65, 97. For example, the movable portion 87 can be formed in an intermediate portion of each of the extending portions 65, 97.

Thus, in accordance with this embodiment form, in addition to operations and effects in the first and second embodiment forms, connecting positions of the auxiliary mirror 61 and the extending portions 65, 97 can be arbitrarily determined if these connecting positions are located on the side of the rear face 61a of the auxiliary mirror 61. Accordingly, a degree of freedom in design is increased.

Further, in this embodiment form, a position and an angle of the auxiliary mirror 55 with respect to the main mirror 53 are set by both a folding angle of an end tip side of the extending portion 97 folded by the movable portion 87 and an external opening angle of the auxiliary mirror 55 opened by the connecting portion 66. In contrast to this, in the above second embodiment form, the position and angle of the auxiliary mirror 55 with respect to the main mirror 53 are set by only the external opening angle provided by the connecting portion 66. Namely, the degree of freedom in design of the auxiliary mirror 55 in this embodiment form is higher than that in the second embodiment form. Accordingly, a region reflected on the auxiliary mirror 55 can be set to have a further wide angle in a wide range.

Modified examples of the attaching portions 21, 23 in the above first to third embodiment forms will next be explained. In the following explanation, the present invention is applied to the main mirror 11 in the first embodiment form, but can be also similarly applied to the main mirror 53 in each of the second and third embodiment forms.

Figure 26:
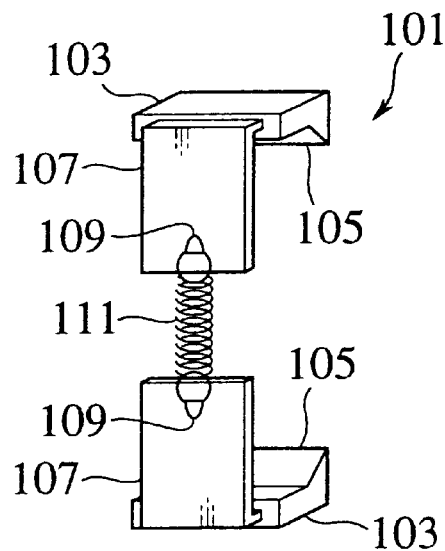
FIG. 26 is a main perspective view showing a modified example of an attaching portion.

An attaching portion 101 in this modified example is used instead of each of the above attaching portions 21 and 23. As shown in FIG. 26, the attaching portion 101 has a pair of upper and lower nipping-supporting portions 103 opposed to each other, plate portions 107 and a spring member 111 formed between the plate portions 107. The plate portions 107 are approximately perpendicularly bent from the respective nipping-supporting portions 103 and extend in directions approaching each other.

Claw portions 105 are formed at one ends of the respective nipping-supporting portions 103 and are projected in directions opposed to each other. An external face of each of the claw portions 105 is covered with a rubber cover for non-slip and preventing damages. Each of the plate portions 107 extends from the other end of each of the nipping-supporting portions 103 and has a hook portion 109 for engaging an end portion of the spring member 111 with the side of an end tip portion of each of the plate portions 107.

Figure 27:
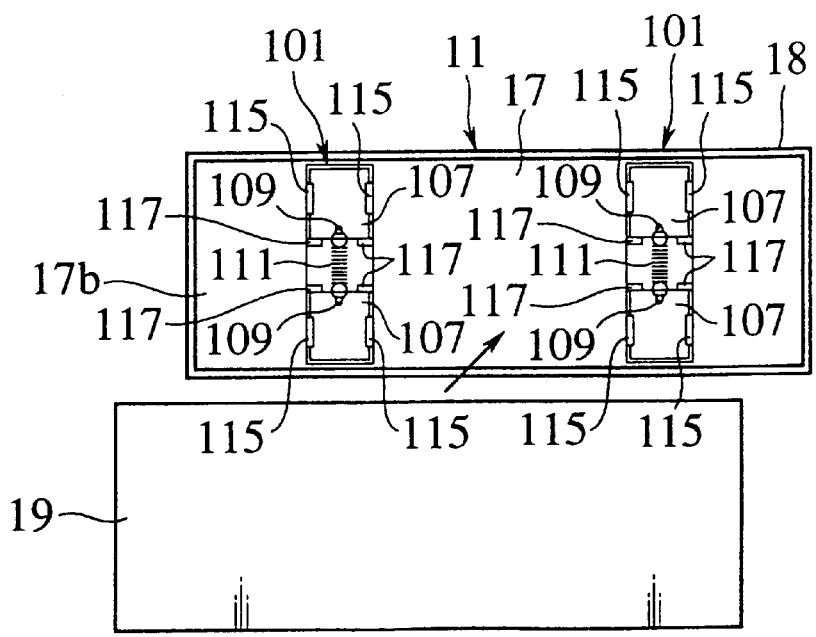
FIG. 27 is a surface view showing a wide room mirror to which the attaching portion of FIG. 26 is applied.
Figure 28:
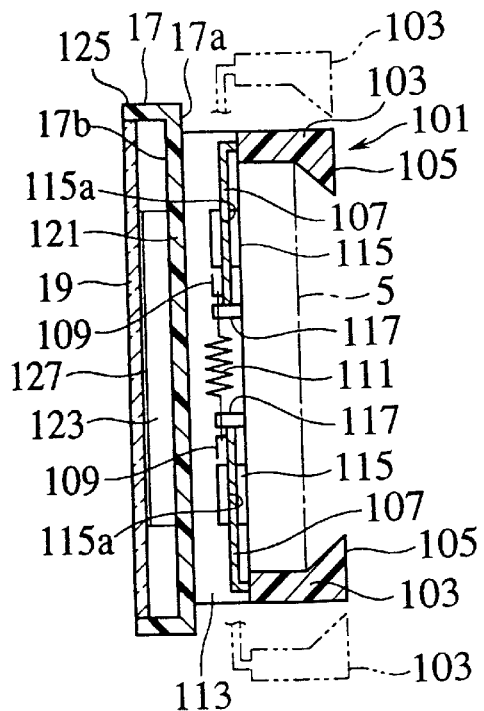
FIG. 28 is a cross-sectional view showing the wide room mirror of FIG. 27.

As shown in FIG. 27, the attaching portion 101 is attached onto the rear face 17a of a main mirror holding plate 17 in each of two left-hand and right-hand positions. Attaching wall portions 113 in four positions are vertically formed on the rear face 17a of the main mirror holding plate 17 in accordance with both side portions of each attaching portion 101 along a vertical direction. As shown in FIG. 28, a guide wall portion 115 and a contact wall portion 117 are projected on an inner wall face of each of the attaching wall portions 113. A guide groove 115a is formed in the guide wall portion 115 and has a width slightly greater than a thickness of the plate portion 107. A side edge of the plate portion 107 is inserted into the guide groove 115a. Thus, the plate portion 107 is supported by the guide groove 115a in a state in which a movement of the plate portion 107 in its width direction is restricted and a movement of the plate portion 107 in the vertical direction is allowed. The contact wall portion 117 comes in contact with an end tip of the plate portion 107 so that the excessive proximity between the plate portions 107 is prevented and disengagement of the spring member 111 from the hook portion 109 is prevented. The main mirror holding plate 17 is constructed by a substrate portion 121 formed in the shape of a flat plate, a projected stripe portion 123 projected on a surface (a surface 17b of the main mirror holding plate 17) of the substrate portion 121, and a frame portion 125 projected from a circumferential edge of the substrate portion 121 onto its surface upward side. A mirror body 19 is fitted onto an inner side of the frame portion 125 of the main mirror holding plate 17 and is stuck to the projected stripe portion 123 by an adhesive double coated tape 127.

In such an attaching portion 101, the claw portion 105 of the lower nipping-supporting portion 103 is engaged with the rear face side of a lower edge portion of the existing room mirror 5. While the main mirror 11 is raised upward against biasing force of the spring member 111, an upper portion of this main mirror 11 is moved onto a side of the existing room mirror 5. The main mirror 11 is moved downward by the biasing force of the spring member 111 in a state in which the claw portion 105 of the upper nipping-supporting portion 103 reaches the rear face side of the room mirror 5. Thus, the upper and lower nipping-supporting portions 103 nip and support the room mirror 5 therebetween in a width direction (vertical direction) of the room mirror 5 by the biasing force of the spring member 111. The main mirror 11 is detachably attached such that the surface 5a of the room mirror 5 is covered with the main mirror 11. The main mirror 11 may be first attached by engagement of the upper nipping-supporting portion 103.

If such an attaching portion 101 is used, the wide room mirror 1 can be attached irrespective of a width (height in the vertical direction) of the existing room mirror 5 so that a general wide using property of the wide room mirror can be further improved.

Each of the above first to third embodiment forms uses a structure for slidably supporting the supporting spherical portions 35, 69 by the supporting concave portions 37, 71 in a supporting form of the auxiliary mirror holding plates 25, 55 in the connecting portions 29, 66. However, the present invention is not limited to this supporting form.

When the structure for slidably supporting the supporting spherical portions 35, 69 by the supporting concave portions 37, 71 is used, the auxiliary mirrors 13, 15, 55, 57 can be set to inclining positions such as slanting upward, slanting downward positions, etc. caused by rotation as long as these auxiliary mirrors do not come in contact with other portions such as the existing mirror 5, the main mirrors 11, 53, etc.

Further, in the above first to third embodiment forms, the shaft bar 31 or the extending portion 65 of each of the connecting members 29, 63, 85 is formed on each of the side faces 17c, 59c of the main mirror holding plates 17, 59. However, it is sufficient to extend the shaft bar 31 or the extending portion 65 from each of circumferential edge portions of the main mirror holding plates 17, 59 along each of plate face directions of the main mirrors 11, 53. Accordingly, for example, the shaft bar 31 or the extending portion 65 can be projected from each of the rear faces 17*a*, 59*a* of the main mirror holding plates 17, 59 and can be extended along each of the plate face directions of the main mirrors 11, 53 such that the shaft bar 31 or the extending portion 65 extends from each of the circumferential edge portions of the main mirror holding plates 17, 59.

What is claimed is:

1. A wide room mirror attached to an existing room mirror, the existing room mirror arranged within a vehicle room, and the wide room mirror comprising:

a main mirror formed in the shape of a plate body and detachably attached to a surface of said existing room mirror such that at least a portion of the surface of the existing room mirror is covered within the main mirror; and an auxiliary mirror moveably connected to said main mirror through a connecting member and supported by the main mirror wherein said connecting member has a non-expansional extending portion extending from a circumferential edge of said main mirror along a plane direction of the main mirror and also has a connecting portion for movably connecting the extending portion onto said auxiliary mirror, said extending portion has a movable portion for allowing an end tip side of the extending portion to be turned with respect to said main mirror, the extending portion also has a base end part integrally formed with the main mirror, said connecting portion connects said auxiliary mirror to an end tip portion of said extending portion; and an end of said auxiliary mirror, said end having a first state for approximately setting the end of the auxiliary mirror to be proximate to an end of said main mirror, said end having a second state in which the end of auxiliary mirror is not proximate with respect to the end of said main mirror, the end of the auxiliary mirror being in a plane of the main mirror in the first state and not in the plane of the main mirror in the second state so that the end of the auxiliary mirror is closer to the existing mirror in the first state than in the second state, the wide room mirror in the first state has a substantially rectangular plate shape as a whole, said extending portion has a movable portion for allowing the end tip portion of the extending portion to be turned with respect to said main mirror, a rear face of said auxiliary mirror has a storing concave portion for storing said extending portion with the movable portion in said first state.

2. A wide room mirror according to claim 1, wherein said auxiliary mirror in said first state is in the same plane as said main mirror and wherein said auxiliary mirror in said second state is not in the same plane as said main mirror.

3. A wide room mirror according to claim 2, wherein said auxiliary mirror moved from said first state is moved away from said existing room mirror.

4. A wide room mirror according to claim 1, wherein said movable portion is arranged in the base end part.

5. A wide room mirror according to claim 1, wherein said connecting portion movably connects the extending portion onto a rear face side of said auxiliary mirror.

6. A wide room mirror attached to an existing room mirror, the existing room mirror arranged within a vehicle room, and the wide room mirror comprising:

a main mirror formed in the shape of a plate body and detachably attached over at least a portion of a surface of said existing room mirror;

an auxiliary mirror; and a connecting member between said auxiliary mirror and said main mirror, the connecting member having a non-expansional extending portion and a connecting portion, the extending portion having a base end part integrally formed with the main mirror and extending from said main mirror along a plane direction of the main mirror, the connecting portion movably connecting to an end tip portion of the extending portion onto said auxiliary mirror, the connecting portion allowing said auxiliary mirror to move from an initial state to an external opening state, an inside end portion of the auxiliary mirror in the initial state being adjacent to said main mirror, and a surface of the auxiliary mirror in the external opening state being inclined outwardly with respect to the main mirror and with respect to the existing room mirror with the inside end portion being not adjacent to said main mirror, the inside end of the auxiliary mirror being in a plane of the main mirror in the initial state and not in the plane of the main mirror in the external opening state, the wide room mirror in the initial state has a substantially rectangular plate shape as a whole, said extending portion has a movable portion for allowing the end tip portion of the extending portion to be turned with respect to said main mirror, a rear face of said auxiliary mirror has a storing concave portion for storing said extending portion with the movable portion in said initial state.

7. A wide room mirror according to claim 6, wherein said connecting portion connects the end tip portion of said extending portion to an outside end portion of said auxiliary mirror farthest from said main mirror in an extending direction of said extending portion.

8. A wide room mirror according to claim 6, wherein said extending portion has a movable portion for allowing the end tip portion of the extending portion to be turned with respect to said main mirror.

9. A wide room mirror according to claim 8, wherein said movable portion is arranged in the base end part.

10. A wide room mirror according to claim 6, wherein a storing concave portion for storing said extending portion in said initial state is formed on the rear face side of said auxiliary mirror.

11. A wide room mirror according to claim 6, wherein said connecting member detachably connects said main mirror and said auxiliary mirror to each other.

12. A wide room mirror according to claim 6, wherein said connecting portion is constructed by a supporting spherical portion formed in one of said extending portion and said auxiliary mirror, and a supporting concave portion formed in the other of said extending portion and said auxiliary mirror and storing and supporting said supporting spherical portion in a movable state.

13. A wide room mirror according to claim 6, wherein the surface of the auxiliary mirror in the initial state is in the same plane as the surface of said main mirror.

14. A wide room mirror according to claim 6, wherein the extending portion extends from a circumferential edge of said main mirror.

15. A wide room mirror according to claim 14, wherein the extending portion and the circumferential edge are integrally formed.

16. A wide room mirror according to claim 6, wherein the extending portion has a plate shape tapered toward the end tip portion.

17. A wide room mirror according to claim 6, wherein the connecting portion movably connects to the end tip portion of the extending portion onto a rear face side of said auxiliary mirror.

18. A wide room mirror attached to an existing room mirror, the existing room mirror arranged within a vehicle room, and the wide room mirror comprising:

a main mirror formed in the shape of a plate body and detachably attached over at least a portion of a surface of said existing room mirror;

an auxiliary mirror; and a connecting member between said auxiliary mirror and said main mirror, the connecting member having a non-expansional extending portion and a connecting portion, the extending portion extending from said main mirror along a plane direction of the main mirror, the connecting portion movably connecting to an end tip portion of the extending portion onto a rear face side of said auxiliary mirror, the connecting portion allowing said auxiliary mirror to move from an initial state to an external opening state, an inside end portion of the auxiliary mirror in the initial state being adjacent to said main mirror, and a surface of the auxiliary mirror in the external opening state being inclined outwardly with respect to the main mirror with the inside end portion being not adjacent to said main mirror, the inside end of the auxiliary mirror being in a plane of the main mirror in the initial state and not in the plane of the main mirror in the external opening state, wherein said extending portion has a movable portion for allowing the end tip portion of the extending portion to be turned with respect to said main mirror, the rear face of said auxiliary mirror has a storing concave portion for storing said extending portion with the movable portion in said initial state.

\* \* \* \* \*